(12) United States Patent
Phelan et al.

(10) Patent No.: US 12,175,306 B2
(45) Date of Patent: Dec. 24, 2024

(54) SERVERLESS FUNCTION MATERIALIZATION THROUGH STRONGLY TYPED API CONTRACTS

(71) Applicant: RED HAT, INC., Raleigh, NC (US)

(72) Inventors: Enda Martin Phelan, Waterford (IE); Wojciech Julian Trocki, Waterford (IE); Manyanda Chitimbo, Val de Marne (FR)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/203,350

(22) Filed: Mar. 16, 2021

(65) Prior Publication Data

US 2022/0300351 A1    Sep. 22, 2022

(51) Int. Cl.
*G06F 9/54* (2006.01)
*G06F 16/245* (2019.01)

(52) U.S. Cl.
CPC .............. *G06F 9/541* (2013.01); *G06F 9/547* (2013.01); *G06F 16/245* (2019.01)

(58) Field of Classification Search
None
See application file for complete search history.

(56) References Cited

U.S. PATENT DOCUMENTS

| | | | | |
|---|---|---|---|---|
| 7,287,259 | B2 * | 10/2007 | Grier | G06F 8/71 719/331 |
| 10,678,678 | B1 * | 6/2020 | Tsoukalas | G06F 11/3664 |
| 10,705,864 | B2 | 7/2020 | Rabasa et al. | |
| 10,742,750 | B2 | 8/2020 | Johnson, II et al. | |
| 10,956,242 | B1 * | 3/2021 | Kumar | G06F 16/951 |
| 11,057,480 | B1 * | 7/2021 | Wells | H04L 67/16 |
| 2015/0128156 | A1 * | 5/2015 | Zhu | G06F 11/302 719/328 |
| 2020/0004730 | A1 * | 1/2020 | Brown | G06F 16/245 |
| 2020/0042297 | A1 * | 2/2020 | Adams | G06F 8/437 |
| 2020/0204618 | A1 | 6/2020 | Agarwal et al. | |
| 2020/0242237 | A1 * | 7/2020 | Simpson | G06F 21/54 |
| 2020/0409780 | A1 * | 12/2020 | Balasubramanian | G06F 9/547 |

FOREIGN PATENT DOCUMENTS

| | | | |
|---|---|---|---|
| WO | 2020101223 A1 | 5/2020 | |
| WO | 2020207595 A1 | 10/2020 | |

OTHER PUBLICATIONS

Goli, A. et al. (Apr. 2020). "Migrating from Monolithic to Serverless: A FinTech Case Study" ICPE: ACM/SPEC International Conference on Performance Engineering, 4 pages.
Nicolas (Mar. 31. 2020). "Migrating Monolithic Apps to Serverless Architecture on AWS" Data Scientist, 12 pages.

* cited by examiner

*Primary Examiner* — Chat C Do
*Assistant Examiner* — William C Wood
(74) *Attorney, Agent, or Firm* — Womble Bond Dickinson (US) LLP (57) ABSTRACT

A method includes identifying a plurality of queries from an application, the plurality of queries associated with an application programming interface (API) and determining an API schema coverage map associated with the plurality of queries. The method further includes generating transformation metadata in view of the API schema coverage map and generating a serverless architecture configuration associated with the application in view of the transformation metadata.

14 Claims, 6 Drawing Sheets

SERVERLESS FUNCTION MATERIALIZATION THROUGH STRONGLY TYPED API CONTRACTS

TECHNICAL FIELD

Aspects of the present disclosure relate to generation and configuration of serverless functions, and more particularly, materialization of serverless functions through strongly typed application programming interface (API) contracts.

BACKGROUND

A serverless function system may be executed by a cloud computing system. The cloud computing system may dynamically manage the allocation and provisioning of serverless functions on servers of the cloud computing system. The serverless functions may be execution environments for the performance of various functions.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Serverless systems execute several individual functions that represent a larger application (e.g., monolithic application) as a set of features and actions. Serverless systems provide for significant cost savings when hosting applications in the cloud and can allow development teams to scale on top of existing infrastructures rather than generating completely separate environments for new initiatives and projects. Conventional serverless systems, however, pose several challenges with respect to development and application performance. Conventional serverless systems may be highly complex and migrating development from monoliths and service oriented architectures (SOAs) to serverless environments is a challenging task. Developing individual functions for business logic and data access in serverless architecture requires substantial planning, forethought, and skill that may require a large number of developers a substantial amount of time to build. Additionally, serverless applications may incur increased latency due to highly complex interdependence of serverless functions. Such latencies are also extremely difficult to identify due to these complex interdependencies. Furthermore, additional complexities in development may arise for serverless systems because the development phase of these architectures is moved to the cloud.

Aspects of the disclosure address the above-noted and other deficiencies by providing systems and methods for generating serverless architectures for applications using strongly typed API contracts. A client side application may be developed as a monolithic application or SOA. During development of the application, the client side application may provide queries to a single API gateway locally that is configured to request and provide responses as though communicating with a serverless setup. The API gateway may include strongly typed API contracts (e.g., GraphQL contracts, or any other strongly typed API). For example, the API gateway may include an API schema to connect queries from the client side application to services for retrieving data from one or more data sources (e.g., databases, connection-Pools, etc.). The client side application may therefore execute any operation provided by the API schema and retrieve data from backend data sources.

Upon deployment of the application, processing logic of a processing device may generate a coverage graph identifying the portions of the API schema that the queries of the client application cover. The processing logic may then generate metadata, referred to herein as transformation metadata, associated with the coverage of the API schema. The processing logic may then generate and configure a serverless architecture based on the transformation metadata. The generated serverless architecture may include serverless containers including services and routes for retrieving data or performing mutations on backend data sources. The processing logic configures the serverless containers using the transformation metadata. Additionally, the processing logic may build a preconfigured gateway to provide an interface for the client application as deployed in the serverless architecture.

Generating the serverless architecture from the transformation metadata generated from the API schema coverage provides for more efficient transition from monolithic and SOA applications to a serverless environment. The resulting serverless architecture reduces latencies of serverless architectures by optimizing the configuration and dependencies of serverless functions. Additionally, the configured serverless containers that are generated may be used later as individual units of deployment. Once developers migrate to the serverless environment they can move their development model to work as a cohesive environment with a deployed serverless ecosystem.

Figure 1:
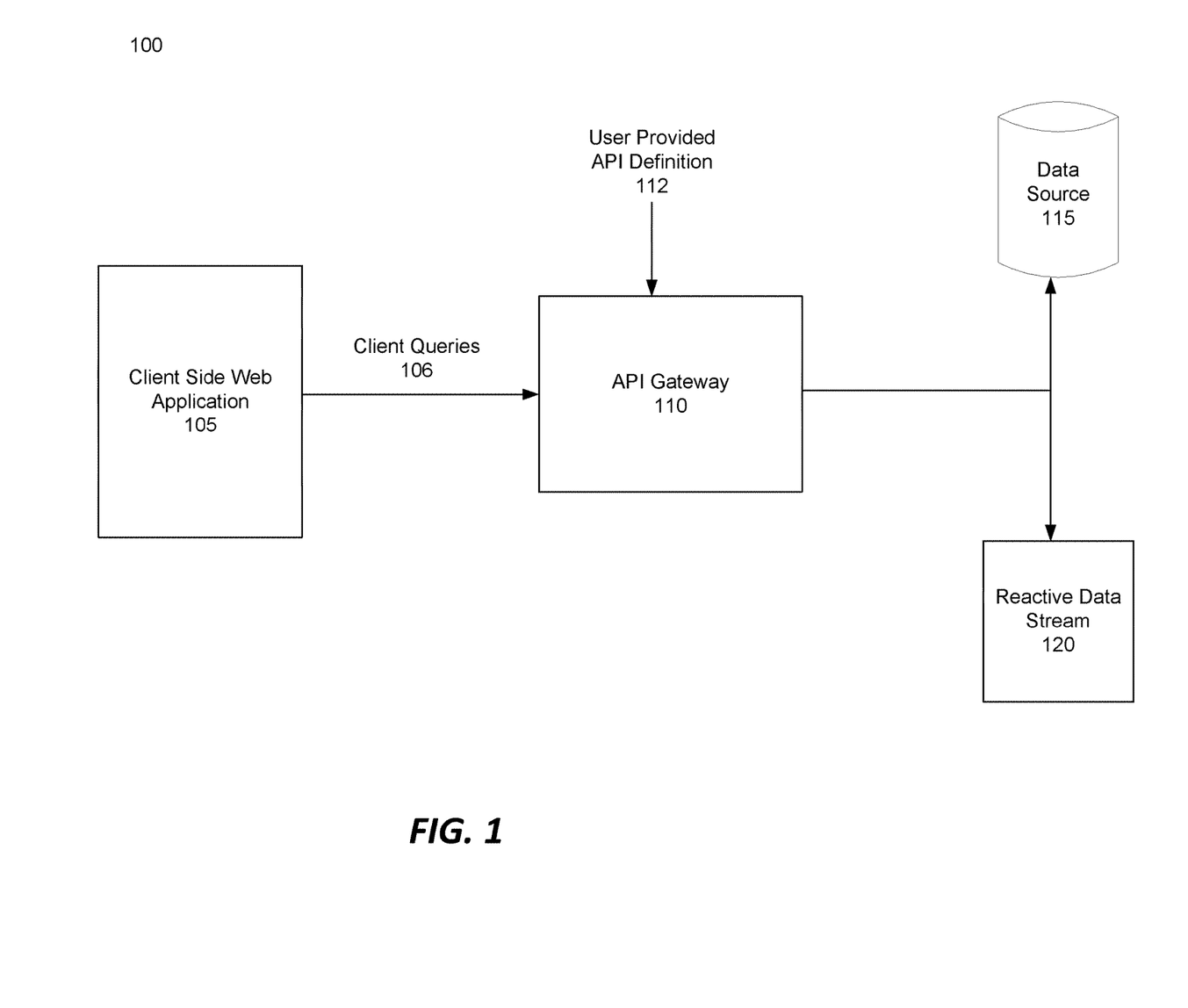
FIG. 1 is a system diagram that illustrates an example system for generating serverless configurations using strongly typed API contracts, in accordance with some embodiments.

FIG. 1 is a block diagram illustrating a system 100 for development of an application from which serverless functions can be materialized using strongly typed API contracts. In one example, system 100 may be a local development environment for developing and testing of the client side application 105. System 100 may include a client side application 105, an API gateway 110, a data source 115 and a reactive data stream 120. The client side application 105 may be one or more client applications executing on a client device providing an interface for a user to communicate with server side applications and logic.

API gateway 110 may include strongly typed API contracts for associating backend data retrieval handlers (also referred to as resolvers) with client queries. A strongly typed API contract may define the behavior of an API. For example, the strongly typed API contract may include definitions of all types, queries, and mutations of the API and client applications 105 may be bound to the defined limits (i.e., definitions) of the API schema. The API gateway 110 may utilize user provided API definitions 112 to generate and use a particular API schema. During execution, the client side application 105 may send client queries 106 to the API gateway 110 which may then be mapped to the associated resolver for retrieving the data from the data source 115 or the reactive data stream 120. In one example, the resolver may retrieve data from the data source 115 in response to a query. Alternatively, a resolver may retrieve data from the reactive data stream 120 in response to an update to data associated with a subscription type query received from the client side application 105.

In one example, the client queries 106 may cover one or more portions of the API schema used by the API gateway 110. As described in further detail below with respect to FIGS. 2 and 3, a serverless configuration module may generate a coverage map of the API schema for the client queries 106 that are used by the client side application 105. Using the generate coverage map and additional metadata collected from operation of the backend resolvers. Using the coverage map and the additional metadata, the serverless configuration module may generate a serverless configuration in which to deploy the application (e.g., the server side data retrieval for the application).

Figure 2:
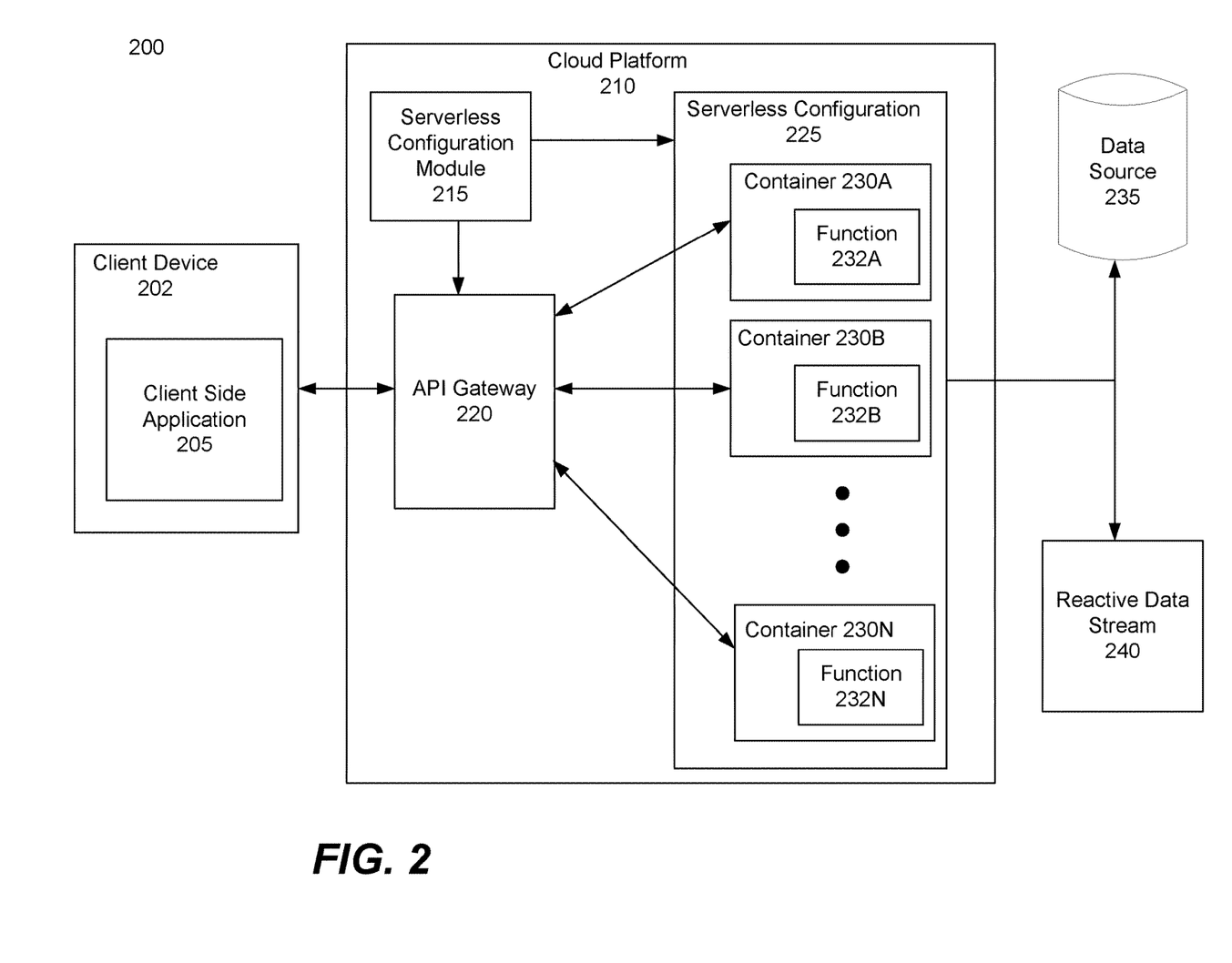
FIG. 2 is a block diagram that illustrates an example system deploying a serverless configuration generated using strongly typed API contracts, in accordance with embodiments of the disclosure.

FIG. 2 is a block diagram that illustrates a system 200 for deployment of serverless functions generated using strongly typed API contracts. System 200 may deploy the application described above with respect to FIG. 1 to a cloud platform to be executed in a serverless environment. As depicted in FIG. 2, system 200 may include a client device 202 executing a client side application 205, and a cloud platform 210. The cloud platform 210 may include a serverless configuration module 215. Although depicted as included in the cloud platform 210, the serverless configuration module 215 may alternatively be located at client device 202, or any other device in communication with the cloud platform 210 and client device 202.

Serverless configuration module 215 may generate serverless configuration 225 and configure API gateway 220 using transformation metadata obtained from the client side application 205. The transformation metadata may include an association between serverless functions and the corresponding API schema, a description of a resolver for the API schema, and one or more database or data source connections.

In one example, serverless configuration module 215 may include an optimization algorithm for allocating operations (or functions) to containers in a serverless architecture. For example, the optimization algorithm may generate a function per API resolver and ignore performance considerations and client side query coverage. In another example, the optimization algorithm may generate a serverless function for each API type covered by the API coverage graph. In another example, the optimization algorithm may generate a function for each usage group providing for the ability to drop cycles in the API schema for circular dependencies. A usage group may be a subset of available queries and mutations that are often used together or are associated with a similar portion of an application. For example, a function to add an item to a shopping cart and a function to order items may be grouped together in a usage group (e.g., a usage group associated with ordering items at a shopping website). In yet another example, the optimization algorithm may generate multi-type functions based on user defined namespaces in the API schema. In one example, a developer of the application may select the optimization algorithm for the serverless configuration module 215 to use to generate the serverless configuration 225. The serverless configuration 225 may include several serverless containers (e.g., function wrappers) including one or more operations of the application distributed in view of the optimization algorithm.

Based on the serverless configuration 225, the serverless configuration module 215 may configure API gateway 220 to correspond to function wrappers 230A-N. Each function wrapper 230A-N may include one or more functions 232A-N of the application. Upon receiving a client query from the client side application 205, the API gateway 220 may instantiate a container for a corresponding function wrapper 230A-N, the container to execute the one or more functions included in the function wrapper 230A-N. For example, each function wrapper 230A-N may be instantiated in response to a particular query received from the client side application 205. The functions 232A-N may retrieve or modify data a data source 235 or reactive data stream 240. Data source 235 may be a database, a connection pool, or other data source. Reactive data stream 240 may provide streamed data to one or more of the functions 232A-N.

Figure 3:
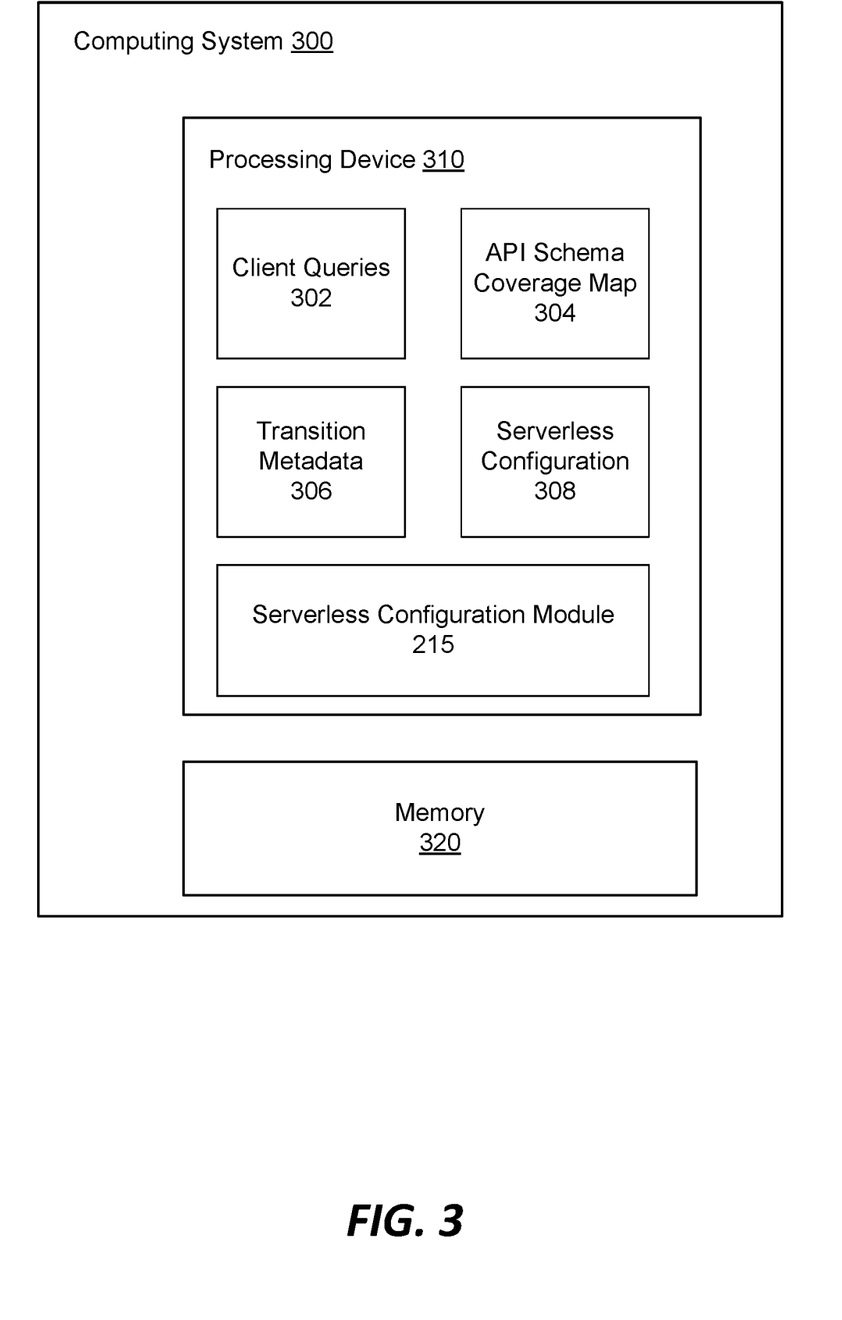
FIG. 3 is a block diagram of another example system for serverless architecture configuration generation, in accordance with some embodiments.

FIG. 3 is a block diagram illustrating a computing device 300 for serverless function materialization using strongly typed API contracts. Computing device 300 includes a processing device 310 and a memory 320. Memory 320 may include volatile memory devices (e.g., random access memory (RAM)), non-volatile memory devices (e.g., flash memory) and/or other types of memory devices. Processing device 310 may include client queries 302, an API schema coverage map 304, transition metadata 306, serverless configuration 308, and serverless configuration module 215. In one example, serverless configuration module 215 may identify client queries 302 from an application. The application may be a monolith application, a service oriented architecture, or any other type of application. In one example, the application may be developed locally on a client device and may interact with a single gateway or server. The serverless configuration module 215 may generate API schema coverage map 304 based on the client queries 302 from the application. The API schema coverage map 304 may indicate portions of an API schema that is used by the application. In one example, the API schema may include strongly typed API contracts, such as a GraphQL schema.

In one example, the serverless configuration module 215 may then use the API schema coverage map 304 to generate transition metadata 306. The serverless configuration module 215 may then generate a serverless configuration 308 for the application using the transition metadata 306. For example, the transition metadata 306 may include an association between serverless functions and the corresponding API schema, a description of a resolver for the API schema, and one or more database or data source connections. Therefore, to generate the serverless configuration 308 using the transition metadata 306, the serverless configuration module may apply the transition metadata to container images (e.g., function wrappers) and distribute functions (e.g., queries) to the container images. In one example, the serverless configuration module 215 may distribute the functions to the serverless containers of the serverless configuration 308 in view of an optimization algorithm. The optimization algorithm may optimize the distribution of functions or operations of the application to serverless containers. For example, the functions may be distributed in a manner that reduces the number of operations, or function calls, required to perform the requested function. In this manner, the serverless configuration module 215 may generate the serverless configuration 308 automatically from the client queries 302 of the application in view of the strongly type API contracts of a user defined API schema.

Figure 4:
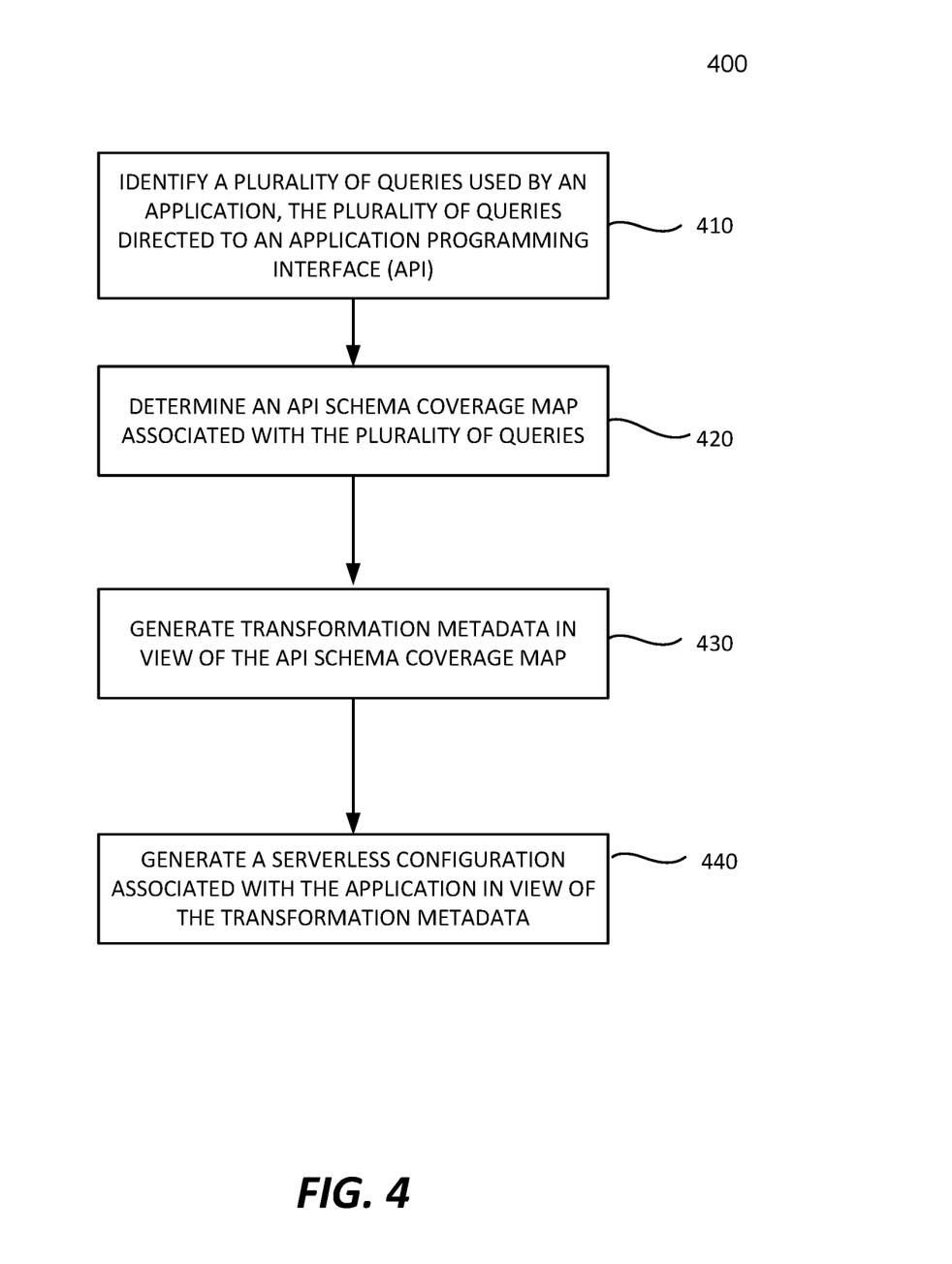
FIG. 4 is a flow diagram of a method of serverless architecture configuration generation in accordance with some embodiments.

FIG. 4 is a flow diagram of a method 400 of a method of generating a serverless architecture configuration, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by a serverless configuration module 215 of FIG. 2.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic identifies a plurality of queries used by an application, the plurality of queries directed to an application programming interface (API). The application may use one or more queries for an API to retrieve data or perform modifications to data at a data store. For example, the queries may be in a particular format (e.g., for a GraphQL API) to retrieve data using some portion of a user defined API schema. Front end and back end developers may collaborate to create an API schema including strongly typed API contracts that can map client side queries to server side functionality. The application may then use a portion or all of the API schema to request data in client queries.

At block 420, the processing logic determines an API schema coverage map associated with the plurality of queries. The API schema coverage map may indicate the portions of the API schema that client queries of the application uses to request data. Accordingly, the API schema coverage map may identify the resolvers (e.g., operations, functions, etc.) that are necessary on the server side to retrieve data for the application.

At block 430, the processing logic generates transformation metadata in view of the API schema coverage map. In one example, the transformation metadata may include an association between serverless functions and the corresponding API schema, a description of a resolver for the API schema, and one or more database or data source connections.

At block 440, the processing logic generates a serverless configuration associated with the application in view of the transformation metadata. In one example, the processing logic may identify, from the transformation metadata, operations of the monolithic application and usage of each of the plurality of operations. The processing logic may then determine an optimized configuration for distributing the plurality of operations of the monolithic application to one or more serverless containers. The processing logic may also configure an API gateway for the configuration such that each of the serverless containers deployed by the configuration communicates with the client side application through the API gateway. For example, the API gateway may be included in a container of the serverless environment which may be configured to communicate with each of the serverless containers of the configuration.

Figure 5:
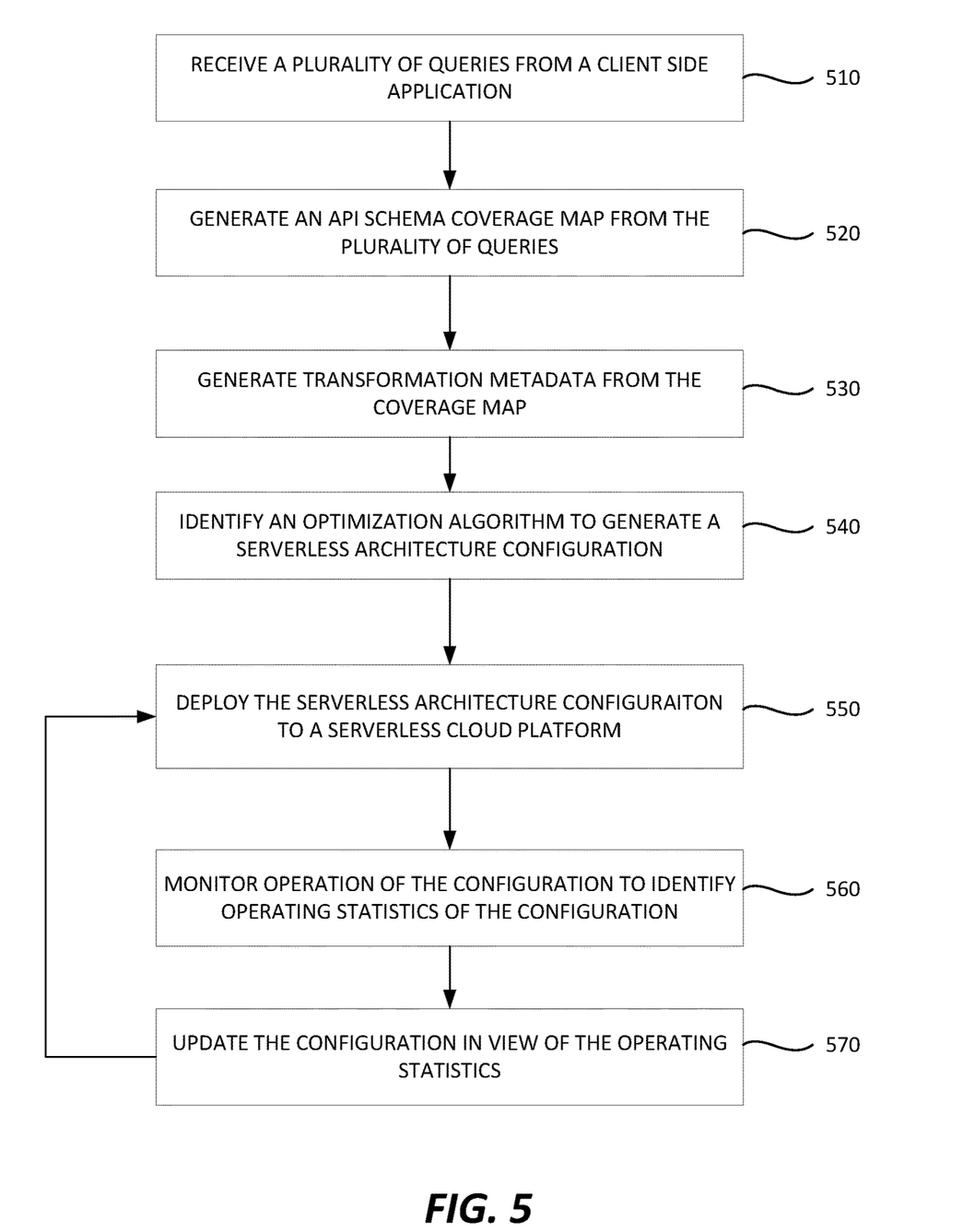
FIG. 5 is a flow diagram of another method of deploying and monitoring a serverless configuration in accordance with some embodiments.

FIG. 5 is a flow diagram of a method 500 of deploying and monitoring a serverless configuration, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by a serverless configuration module 215 of FIG. 2.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where the processing logic receives a plurality of queries from a client side application. At block 520, the processing logic generates an API schema coverage map from the plurality of queries. At block 530, the processing logic generates transformation metadata from the coverage map.

At block 540, the processing logic identifies an optimization algorithm to generate a serverless architecture configuration. In one example, the optimization algorithm may generate a function per API resolver and ignore performance considerations and client side query coverage. In another example, the optimization algorithm may generate a serverless function for each API type covered by the API coverage graph. In another example, the optimization algorithm may generate a function for each usage group providing for the ability to drop cycles in the API schema for circular dependencies. In yet another example, the optimization algorithm may generate multi-type functions based on user defined namespaces in the API schema.

At block 550, the processing logic deploys the serverless architecture configuration to a serverless cloud platform. At block 560, the processing logic monitors operation of the configuration to identify operating statistics of the configuration. For example, the processing logic may monitor the operation of each of the functions generated by the optimization algorithm. The processing logic may identify latencies associated with one or more or the functions of the serverless configuration as the application configuration executes.

At block 570, the processing logic updates the configuration in view of the operating statistics. In one example, the functions that are identified as having high latencies which can cause delays in operation of the application may be reconfigured. The processing logic may then return to block 550 to deploy the updates to configuration to the serverless cloud platform.

Figure 6:
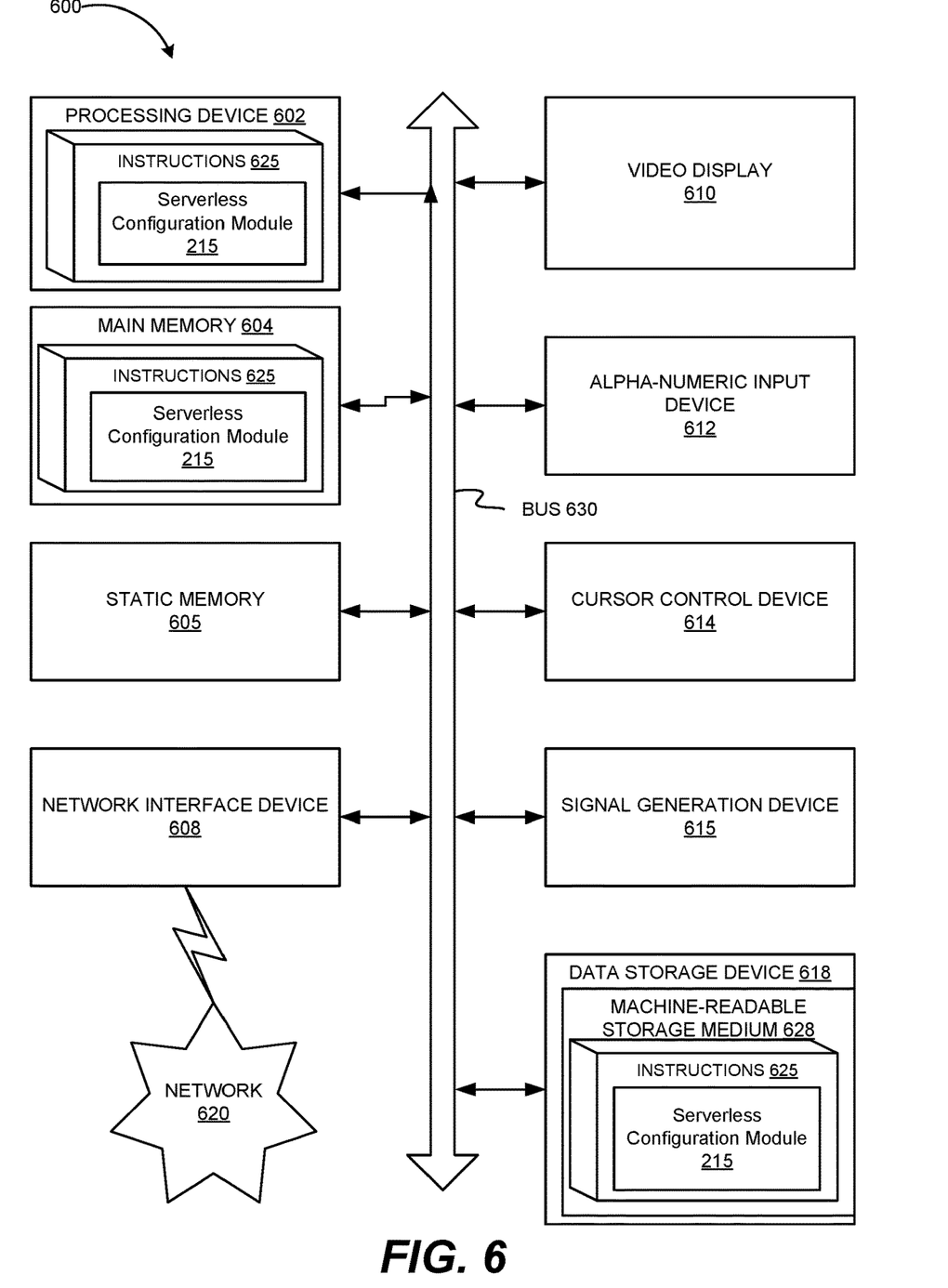
FIG. 6 is a block diagram of an example apparatus that may perform one or more of the operations described herein, in accordance with some embodiments of the present disclosure.

FIG. 6 is a block diagram of an example computing device 600 that may perform one or more of the operations described herein, in accordance with some embodiments.

Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 605 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 615 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a serverless configuration module, e.g., serverless configuration module 215, for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   identifying, from an application, a plurality of queries to retrieve data, the plurality of queries associated with an application programming interface (API);
   determining an API schema coverage map associated with the plurality of queries, wherein the API schema coverage map indicates portions of an API schema that are used by the application;
   generating, by a processing device in view of the API schema coverage map, transformation metadata in view of the API schema coverage map, wherein the transformation metadata comprises an association between serverless functions and corresponding API schema, a description of a resolver for the API schema, and one or more database connections; and
   generating, by the processing device, a serverless architecture configuration associated with the application in view of the transformation metadata, wherein generating the serverless architecture configuration comprises:
   identifying, from the plurality of queries, a first subset of queries that are associated with a first group of similar portions of the application;
   identifying, from the plurality of queries, a second subset of queries that are associated with a second group of similar portions of the application;
   generating, based on the first subset and the second subset, a plurality of functions that are each configured to drop cycles in the API schema for circular dependencies; and
   generating a plurality of multi-type functions based on a plurality of user defined namespaces in the API schema; and
   deploying the serverless architecture configuration to a plurality of serverless containers each comprising one or more operations associated with the application.

2. The method of claim 1, further comprising:
   monitoring operation of the plurality of serverless containers of the serverless architecture configuration to detect latencies in one or more of the plurality of serverless containers; and
   updating the serverless architecture configuration in view of the latencies in the one or more plurality of serverless containers.

3. The method of claim 1, wherein each of the plurality of serverless containers communicates with a single API gateway.

4. The method of claim 1, wherein the API schema comprises strongly typed API contracts to identify the one or more operations in view of the API schema coverage map.

5. The method of claim 1, wherein generating the serverless architecture configuration further comprises:
   identifying, from the transformation metadata, a plurality of operations of the application to provide a service, and
   determining an optimized configuration for distributing a reduced number of operations of the plurality of operations of the application to a plurality of serverless containers, wherein the plurality of serverless containers execute the reduced number of operations of the plurality of operations to provide the service.

6. A system comprising:
   a memory; and
   a processing device operatively coupled to the memory, the processing device to:
   identify, from an application, a plurality of queries to retrieve data, the plurality of queries associated with an application programming interface (API);
   determine an API schema coverage map associated with the plurality of queries, wherein the API schema coverage map indicates portions of an API schema that are used by the application;
   generate transformation metadata in view of the API schema coverage map, wherein the transformation metadata comprises an association between serverless functions and corresponding API schema, a description of a resolver for the API schema, and one or more database connections;

generate a serverless architecture configuration associated with the application in view of the transformation metadata, wherein to generate the serverless architecture configuration is to:
  identify, from the plurality of queries, a first subset of queries that are associated with a first group of similar portions of the application;
  identify, from the plurality of queries, a second subset of queries that are associated with a second group of similar portions of the application;
  generate, based on the first subset and the second subset, a plurality of functions that are each configured to drop cycles in the API schema for circular dependencies;
  generate a plurality of multi-type functions based on a plurality of user defined namespaces in the API schema; and
  deploy the serverless architecture configuration to a plurality of serverless containers each comprising one or more operations associated with the application.

7. The system of claim 6, wherein the processing device is further to:
  monitor operation of the plurality of serverless containers of the serverless architecture configuration to detect latencies in one or more of the plurality of serverless containers; and
  update the serverless architecture configuration in view of the latencies in the one or more plurality of serverless containers.

8. The system of claim 6, wherein each of the plurality of serverless containers communicates with a single API gateway.

9. The system of claim 6, wherein the API schema comprises strongly typed API contracts to identify the one or more operations in view of the API schema coverage map.

10. The system of claim 6, wherein to generate the serverless architecture configuration is further to:
  identify, from the transformation metadata, a plurality of operations of the application to provide a service, and
  determine an optimized configuration for distributing a reduced number of operations of the plurality of operations of the application to a plurality of serverless containers, wherein the plurality of serverless containers execute the reduced number of operations of the plurality of operations to provide the service.

11. A non-transitory computer-readable storage medium including instructions that, when executed by a processing device, cause the processing device to:
  identify, from an application, a plurality of queries to retrieve data, the plurality of queries associated with an application programming interface (API);
  determine an API schema coverage map associated with the plurality of queries, wherein the API schema coverage map indicates portions of an API schema that are used by the application;

generate, by the processing device, transformation metadata in view of the API schema coverage map, wherein the transformation metadata comprises an association between serverless functions and corresponding API schema, a description of a resolver for the API schema, and one or more database connections;
generate, by the processing device, a serverless architecture configuration associated with the application in view of the transformation metadata, wherein to generate the serverless architecture configuration is to:
  identify, from the plurality of queries, a first subset of queries that are associated with a first group of similar portions of the application;
  identify, from the plurality of queries, a second subset of queries that are associated with a second group of similar portions of the application;
  generate, based on the first subset and the second subset, a plurality of functions that are each configured to drop cycles in the API schema for circular dependencies; and
  generate a plurality of multi-type functions based on a plurality of user defined namespaces in the API schema; and
  deploy the serverless architecture configuration to a plurality of serverless containers each comprising one or more operations associated with the application.

12. The non-transitory computer-readable storage medium of claim 11, wherein the processing device is further to:
  monitor operation of the plurality of serverless containers of the serverless architecture configuration to detect latencies in one or more of the plurality of serverless containers; and
  update the serverless architecture configuration in view of the latencies in the one or more of the plurality of serverless containers.

13. The non-transitory computer-readable storage medium of claim 11, wherein each of the plurality of serverless containers communicates with a single API gateway.

14. The non-transitory computer-readable storage medium of claim 11, wherein to generate the serverless architecture configuration is to:
  identify, from the transformation metadata, a plurality of operations of the application to provide a service, and
  determine an optimized configuration for distributing a reduced number of operations of the plurality of operations of the application to a plurality of serverless containers, wherein the plurality of serverless containers execute the reduced number of operations of the plurality of operations to provide the service.

* * * * *